US006047994A

United States Patent [19]

Augustinus et al.

[11] Patent Number: 6,047,994

[45] Date of Patent: Apr. 11, 2000

[54] BLOCKING ARRANGEMENT

[75] Inventors: Per Kurt Augustinus, Svendborg; Bernt Ipsen, Morud, both of Denmark

[73] Assignee: Micro Matic A/S, Denmark

[21] Appl. No.: 08/421,532

[22] Filed: Apr. 13, 1995

Related U.S. Application Data

[63] Continuation of application No. PCT/DK94/00463, Dec. 9, 1994.

[30] Foreign Application Priority Data

Dec. 9, 1993 [DK] Denmark ................................ 1375/93

[51] Int. Cl.[7] ...................................................... F16L 35/00

[52] U.S. Cl. ......................... 285/81; 285/136.1; 285/321; 285/375; 285/924

[58] Field of Search .................................... 285/321, 924, 285/81, 921, 386, 387, 375, 136.1

[56] References Cited

U.S. PATENT DOCUMENTS

| | | | |
|---|---|---|---|
| 2,952,480 | 9/1960 | Prill et al. | 285/321 X |
| 3,453,005 | 7/1969 | Foults | 285/924 X |
| 3,718,350 | 2/1973 | Klein | 285/924 X |
| 3,922,011 | 11/1975 | Walters | 285/321 X |
| 4,007,953 | 2/1977 | Powell . | |
| 4,111,464 | 9/1978 | Asano et al. | 285/321 X |
| 4,229,950 | 10/1980 | Fessenden | 285/321 X |
| 4,240,654 | 12/1980 | Gladieux | 285/321 X |
| 4,707,000 | 11/1987 | Torgardh | 285/924 X |
| 4,750,765 | 6/1988 | Cassidy et al. | 285/321 X |
| 5,176,413 | 1/1993 | Westman | 285/321 |

FOREIGN PATENT DOCUMENTS

| | | | |
|---|---|---|---|
| 695250 | 9/1964 | Canada | 285/321 |
| 0056295 | 7/1982 | European Pat. Off. . | |
| 0287446 | 10/1988 | European Pat. Off. . | |
| 3734948 | 12/1988 | Germany | 285/321 |
| 2173572 | 10/1986 | United Kingdom . | |
| 2228055 | 8/1990 | United Kingdom . | |

*Primary Examiner*—Dave W. Arola
*Attorney, Agent, or Firm*—Brooks & Kushman P.C.

[57] ABSTRACT

A blocking arrangement serves for securing prevention of a spear (1) being unscrewed from a corresponding neck ring (3) in a container for a liquid, for example, beer, being under pressure by a drive gas in the container. The blocking arrangement consists of a split spring ring (8) which is placed in a groove (5) constructed in the corresponding neck ring (3). This groove is so deep that the spring ring is allowed to be squeezed radially into the groove. The expansion for the spring ring radially outwardly is limited, however, by in inwardly turning cylinder face (22) on the spear (1). Furthermore, the spear has an upwardly turning blocking face (12) which adjoins the cylinder face (22). When dismounting of the spear is attempted, its blocking face (12) adjoins the spring ring (8) which is retained axially by the downwardly turning upper side (16) of the groove. To prevent the axial forces by which the spring ring (8) is acted on from working the spring ring free of the blocking face (12), the spring (8) has a larger thickness at the outside diameter than at the inside diameter. Thereby, the blocking arrangement provides the optimal security against an unauthorized person removing a spear during an over-pressure in the container.

5 Claims, 5 Drawing Sheets

BLOCKING ARRANGEMENT

This present application is a continuation of international application No. PCT/DK94/00463 filed in Denmark on Dec. 9, 1994, designating the United States, and claiming the priority of Danish application serial No. 1375/93, filed Dec. 9, 1993.

TECHNICAL FIELD

This invention relates to a blocking arrangement for the coaxial prevention of withdrawal of a first cylindrical member from a second member, and more particularly, the prevention of withdrawal of a spear from a beverage container such as a beer keg.

BACKGROUND OF THE INVENTION

Arrangements for the unwanted coaxial withdrawal of a first cylindrical member from a second member and mechanisms for preventing this withdrawal are known. To illustrate this, spears for dispensing a liquid, e.g. beer under pressure of a drive gas, e.g. $Co_2$ in a usually transportable container, can be considered.

In a mounted condition, the spear is fixed in a neck ring in the container by means of, for example, a screw assembly and locked in this position by means of a spring ring. The latter is placed in a groove in the neck ring, while there in the spear is a blocking face, gripping under the spring ring and thereby preventing the spear from being dismounted.

This arrangement serves a special safety purpose. If the spear is dismounted while there still is an over-pressure in the container, an accident might occur since the spear, under the subjected over-pressure, may release from the container.

However, the spring ring is not able in all cases to provide the security demanded to prevent dismounting. In some cases, the spring ring is worked into the groove by the opposite blocking face which, during the dismounting, is liable to make a movement simultaneously with the spring ring. This movement might be a rotation if the spear is mounted with a screw assembly. When the spring ring is pressed into the groove of the neck ring, it is no longer able to secure the spear from an axial displacement between the two parts.

There is, therefore, a need for a blocking arrangement of the type which is able to provide complete security against reciprocal displacement between of the two parts.

SUMMARY OF THE INVENTION

The above need is met by the following invention.

The invention relates to a blocking arrangement comprising a substantially cylindrical first part with a central axis and a mainly radially outwards extending first blocking face, an around the first part concentrically placed second part with an opposite to the first blocking face turning, mainly radially inwards extending second blocking face, which has a larger inside diameter than the outside diameter of the first blocking face, and a split spring ring. The spring ring is placed between the two blocking faces, reaching, in relieved position, across both blocking faces and being allowed in only one radial direction such as deformation that the spring ring can be brought out of reach of the blocking face placed in front, as seen in relation to the deformation direction. The split spring ring has a first side face turning towards the first blocking face and a second side face turning towards the second blocking face such that opposite axial forces acting on the first part and the second part, respectively, are transmitted via the spring ring by means of mainly on both sides of the spring ring operating edgewise contact with a working face, which in dependence of the construction chosen and the distortion of the spring ring under the subjected stress, could be either a blocking face or a side face. The blocking face or side face defining, as seen in axial section, an attack angle in relation to a plane standing perpendicular to the central axis.

The above mentioned arrangement is expedient in having an extremely simple and cheap construction. The arrangement can therefore be used for many different purposes within the machinery industry.

This invention provides novel and unique features by providing that the total of the size of the two attack angles, measured with positive sign when the angle diverges in the deformation direction allowed, is sufficiently large that the spring ring is not brought out of reach of said one blocking face under the subjected axial forces, even if the two parts at the same time are exposed to a screwing, rocking or any other movement in relation to each other.

The novel and unique features by means of which this is obtained, consisting in the fact, according to the invention, that the total of the size of the two attack angles, measured with positive sign, when the angle diverges in the deformation direction allowed, as maximum being so big that the spring ring is not being brought out of reach of said one blocking face under the subjected axial forces thereby preventing that said opposite acting axial forces axially can displace the first part in relation to the second part even if the two parts at the same time are exposed to a screwing, rocking or any other movement in relation to each other.

If one of the blocking faces of the blocking arrangement is considered as a wedge face, the arrangement will be self-blocking, if the angle of inclination of this wedge face is smaller than the friction angle and this will normally in practice always be the case.

In conventional blocking arrangements, the effect of self-blocking will not always, however, be sufficient to prevent the spring ring from being deformed radially free of the blocking face in question. By unscrewing the above mentioned spear, an edge of the blocking face might therefore be able to actually screw the spring ring into the corresponding groove.

This drawback associated with conventional blocking arrangements can be avoided by means of the blocking arrangement according to the invention, where the radial resultant of the axial forces cannot be big enough to overcome the simultaneously operating friction forces and the elastic force of the spring ring. A special high security will in this connection be obtained when the total of the two attack angles are equal to zero or less than zero, as will be defined later.

In a preferred embodiment, as is expedient owing to its great simplicity, the spring ring might have, contrary to conventional spring rings, a larger thickness at the outside diameter than at the inside diameter, and furthermore have a trapezoidal cross section.

By another appropriate embodiment, where the spring ring is placed in a groove in one of the parts and deformation is only allowed in this groove, one side of which furthermore forms a blocking face, this can moreover in relation to a plane standing perpendicular to the central axis, seen in axial section, advantageously form an angle which converges in the deformation direction.

BRIEF DESCRIPTION OF THE DRAWINGS

The invention will be explained more fully by the following description of an embodiment, which just serves as an example, with reference to the drawing, in which.

BEST MODE FOR CARRYING OUT THE INVENTION

Figure 2:
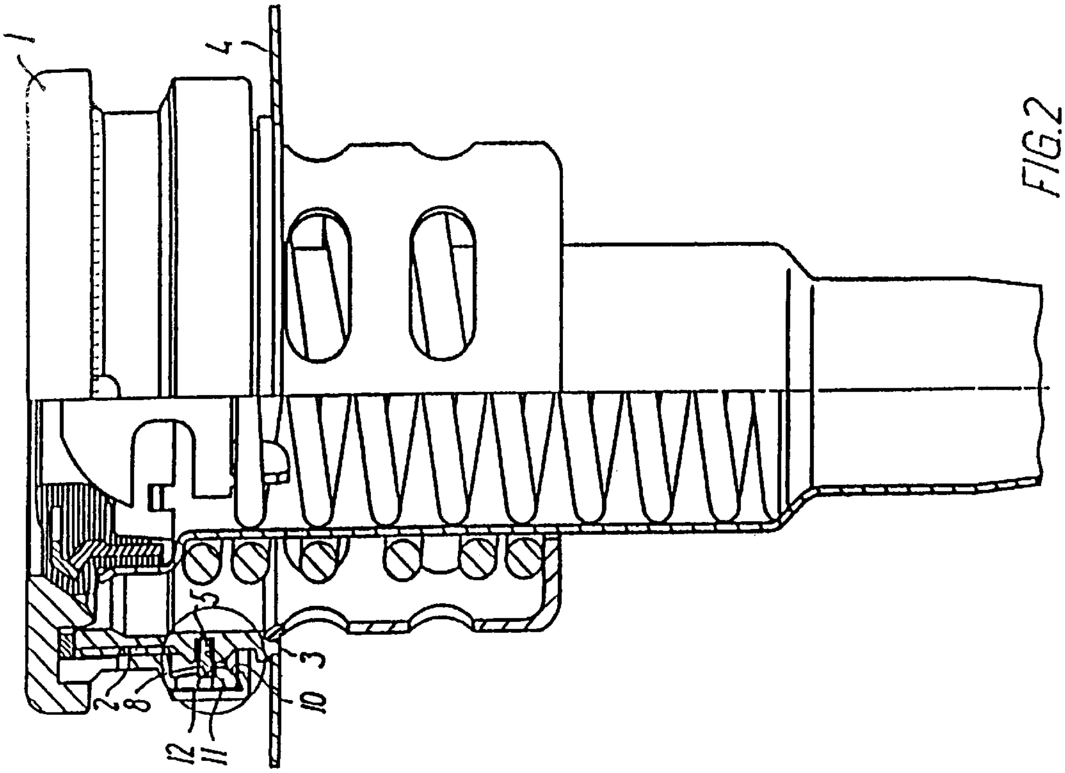
FIG. 2 shows the same, but with a blocking arrangement according to the invention.
Figure 1:
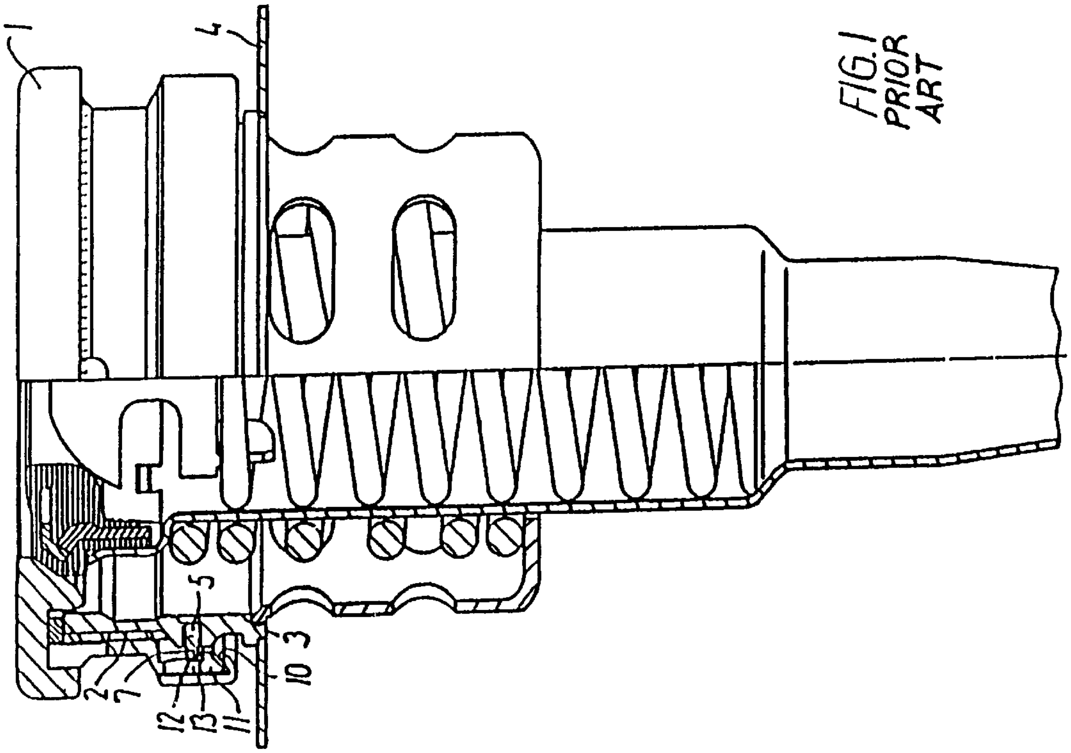
FIG. 1 PRIOR ART
FIG. 1 is a partial axial section side view of a conventional blocking arrangement in a spear, screwed into a neck ring in a container.

In FIGS. 1 and 2, a spear 1 is shown by which a screw thread 2 is screwed into a neck ring 3, welded on a container 4, of which only a fragment can be seen. Such a spear is normally used as a valve for dispensing beer, for example, under pressure of a drive gas, e.g. $CO_2$, in a transportable container. This spear system itself serves in this connection only as an exemplification of the invention, and is consequently not described in detail here.

Figure 5:
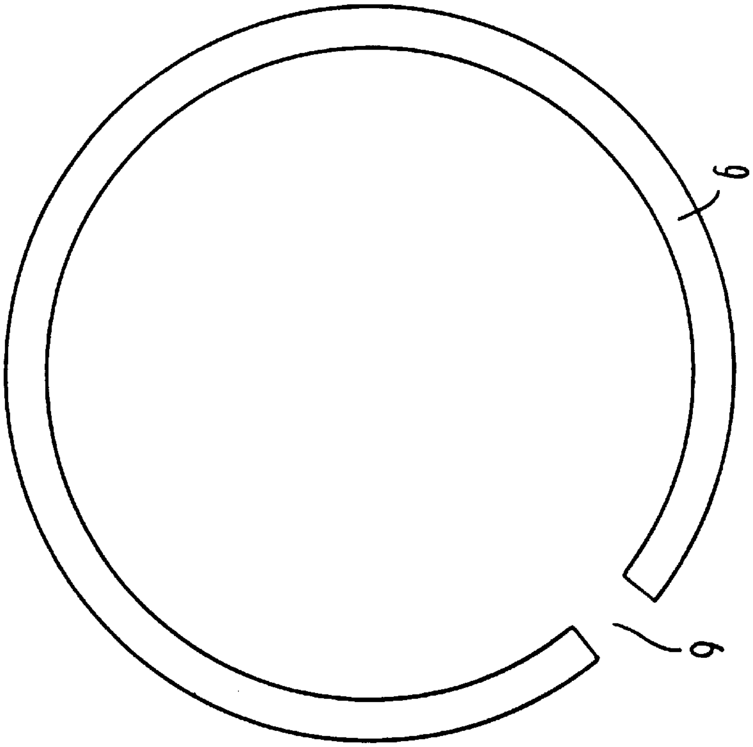
FIG. 5 is a top view of a spring ring.

In the neck ring 3, a groove 5 has been formed in which a split spring ring 6 is placed in which FIG. 5 can be seen in a plain picture. In FIG. 1, the spring ring is a conventional spring ring 7 and in FIG. 2, a spring ring 8 according to the invention. In both cases, the spring ring is shown in a relieved condition.

As shown in FIG. 5, the spring ring 6 has an open slit 9 permitting the spring ring to be squeezed together and into the groove 5. This takes place when the spear 1 is screwed into the neck ring 3, and then a lower conical face 10 on an inwardly turning projection 11 of the spear 1 will press the spring ring into the groove 5, and thus the projection 11 will be able to pass down past the spring ring. As soon as this has taken place, the spring ring will thereafter return to the relieved condition a shown in FIGS. 3*b* and 3*c,* where the spring ring now reaches across an upwards turning face 12 on the projection 11.

As it appears, the inwardly turning projection 11 will operate as a sort of a barb, which after being placed under the spring ring is unable to be displaced in the opposite direction. When the spear is to be dismounted, it will therefore be necessary to actively force the spring ring into the groove 5 so that the projection 11 is allowed to pass up past the spring ring. For this purpose, in the area around the spring ring there is formed a row of passage holes 13 along the periphery of the spear. During normal use, these holes are covered by a shield 14 made of a material, for example, plastic, which can be relatively easily broken. In order to make it easier to break the shield 14, there is provided at least one breakage indicator 15 on shield 14.

When the spear is to be dismounted, the shield 14 is broken and removed, so that there will be free access to the holes 13 from the outside. With a special tool adapted for the purpose having pins which can be let through the holes 13, the spring ring 6 then can be squeezed into the groove 5, whereafter the projection 11 can pass the spring ring and allow the dismounting of the spear.

A spear of the type shown in FIGS. 1 and 2 will normally always be fixed into the neck ring with a primary connection, which with great security is able to absorb the forces by which the drive pressure in the container acts on the spear in an outward direction. In the cases shown, the spear 1 is assembled with the neck ring 3 by means of a thread 2, and the spear can, therefore, be screwed off the neck ring without further preparations. If this takes place while there is still an over-pressure in the container, the spear may come out.

It is, therefore, necessary that the pressure in the container be relieved before the spear is being dismounted. Authorized operators are fully aware of this fact, while that will normally not be the case with unauthorized persons who, for some reason, might want to dismount the spear. The spring ring 7 and the upwards turning face 12 of the projection 11 and the upper, downwardly turning face 16 of the groove 5 will together form a blocking arrangement which is meant to prevent unauthorized persons from screwing off the spear. These persons will, due to the shield 14, not have a direct access to the holes 13, and therefore, they will not be able to manipulate the spring ring 7 so that it is squeezed together in such a way that the projection 11 can pass. In spite of this, it has been seen that unauthorized persons have been able to dismount the spear when using a conventional blocking arrangement, as shown in FIG. 1. The reason for this is explained in the following, referring to FIGS. 3*a, b* and *c,* where the blocking arrangement, in larger scale as shown in FIG. 1, can be seen in three different steps during the dismounting.

Figure 3C:
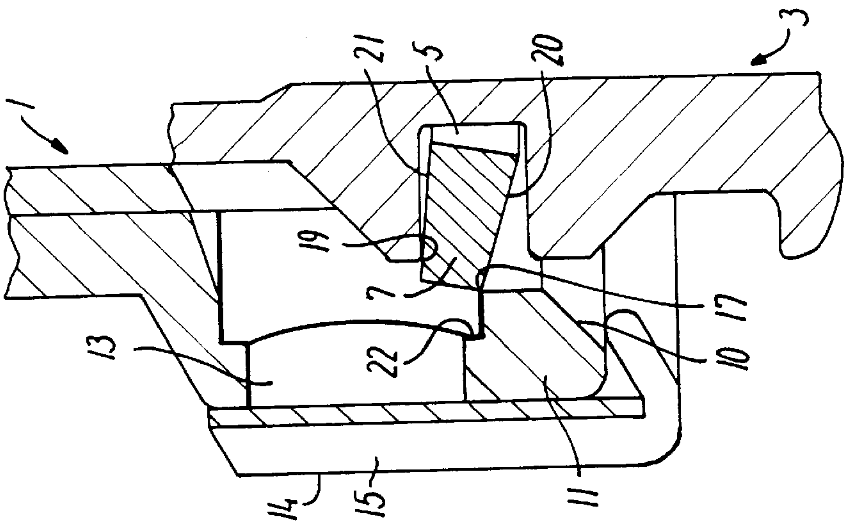
FIGS. 3*a, b* and *c* is the blocking arrangement shown in FIG. 1, seen in three successive steps during dismounting of the spear.
Figure 3B:
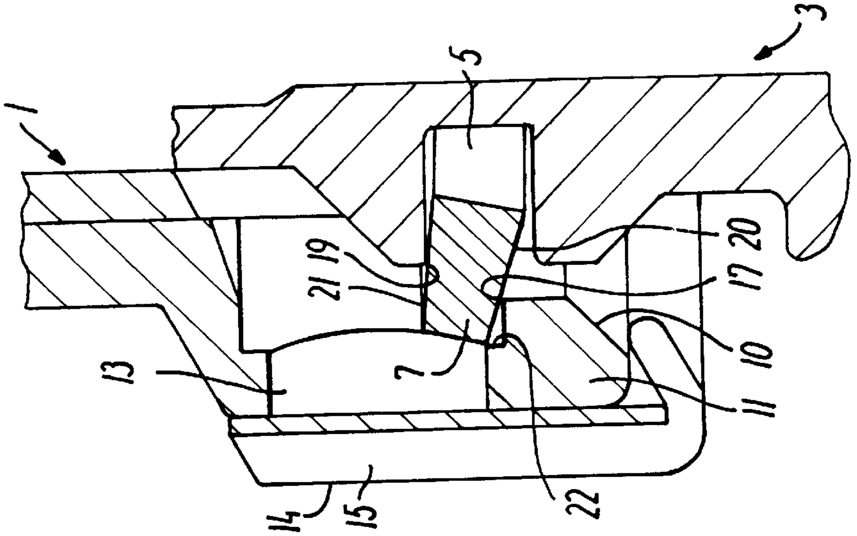
Figure 3A:
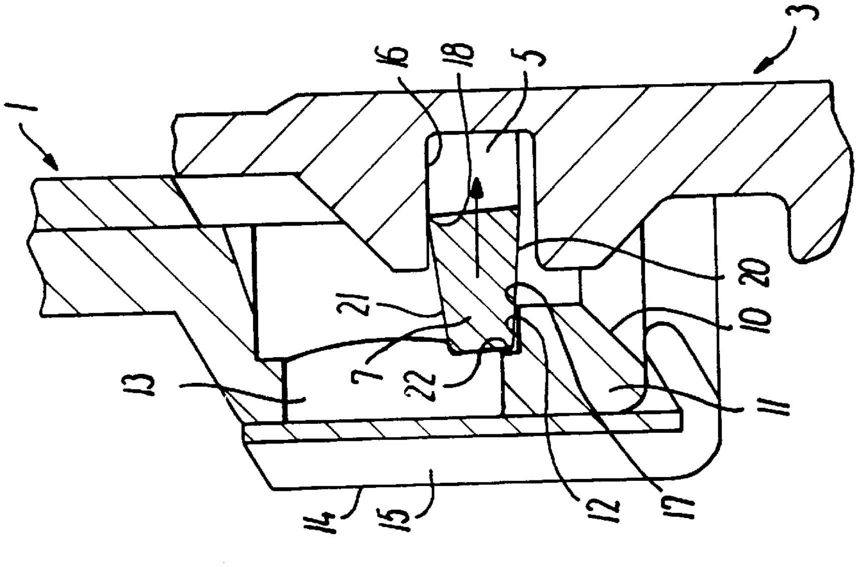

In FIG. 3*a,* the spear 1 is unscrewed to such an extent in relation to the neck ring 3, that an edge 17 of the upwardly turning face 12 of projection 11 has come to edgewise contact with the lower side face 20 of spring ring 7, whereby the spring ring has been lifted up so an upper edge 18 of the spring ring has come to an edgewise contact with the downwardly turning face 16 of groove 5. As shown, an inwardly turning cylinder face 22 placed over the projection 11 limits the possibility of the spring ring expanding radially outwardly, while the spring ring by squeezing freely is allowed to deform into the groove 5 in the deformation direction, as shown by the arrow.

If the unscrewing of spear 1 is continued, the spring ring will now be acted on by reverse axial forces, resulting in distorting of the spring ring, that means the cross-section of the spring ring is turning as compared to the starting point, as shown in FIG. 3*b.* As it can be seen, the axial forces are transmitted by edgewise contact between, on the one side the edge 17 of the projection 11's upwards turning face 12 and the spring ring 7's downwards turning face 20, and on the other side between the edge 19 of the groove 5's upper side 16 and the upper side face 21 of the spring ring. In FIGS. 3*a, b* and *c,* the sizes of the angles, which the spring ring's side faces 20, 21 are forming with a plane standing perpendicular to the central axis of the spear, have, for illustrative reasons, been drawn with some exaggeration. In practice, these angles will be so small that the arrangement will be self-blocking when in the relieved position, that is, when the two parts only are attempting to be displaced axially in relation to each other. In this case, the acting axial forces will not be able to squeeze the spring ring together in the deformation direction allowed.

This condition, however, will come to an end when the acting on the spring ring is changed from a resting load into a situation where the spring ring is rotating in relation to the edges 17, 19 transmitting the axial forces to the side faces 20, 21 of the spring ring. This is best understood by seeing FIG. 7*a,* where the side faces 20, 21 of the spring ring are schematically shown. The stipulated line X—X is symbolizing a plane extending perpendicular to the central axis of the spear. The side face 20 forms an angle α with this central plane and the side face 21 an angle β. These angles are measured with positive sign when they diverge away from the plane represented by line X—X in the deformation direction, as shown in FIG. 3*a* with the arrow, that means, towards the groove 5 or in the direction from the left to the right in FIG. 7*a,* where both angles thus are positive.

Figures 7A, 7B, 7C, 7D:
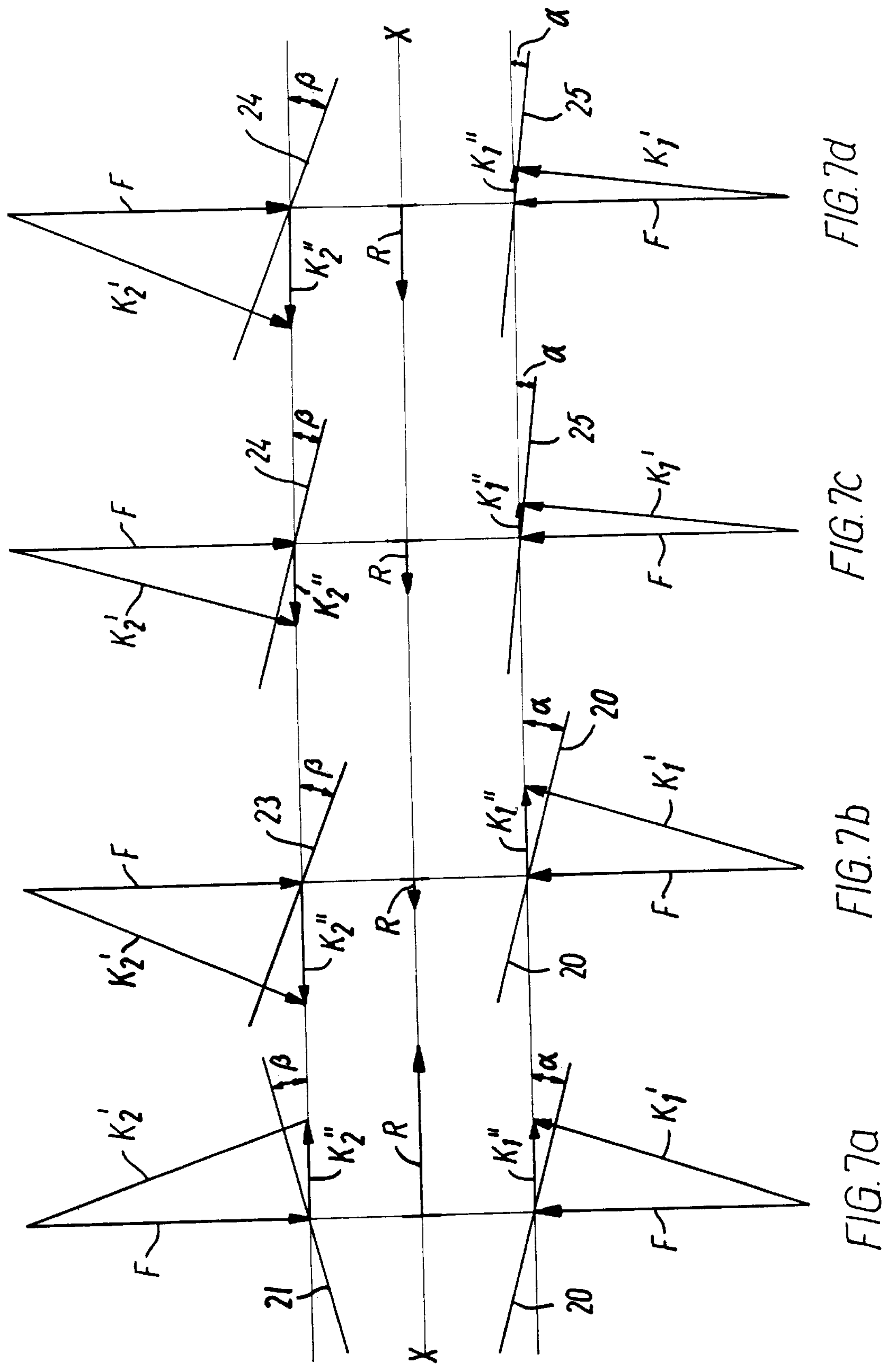
FIGS. 7*a, b, c* and *d* are vector diagrams for the acting resultant axial forces broken down into components by various configurations of the blocking arrangements.

The two side faces 20, 21 are acted on by opposite directed equal axial forces F. The axial force F of the side face 20 is in FIG. 7*a* disintegrated in a normal force $K^1$ and a horizontal component K1". Correspondingly, the normal force F on the side face 21 is disintegrated in a normal force K2' and a horizontal component K2". The total of the two horizontal component K1", K2" are combined to produce the resultant R. In FIG. 7*a,* the resultant R is acting in the same direction as the deformation direction, and thus it will try to squeeze the spring ring radially into the groove 5, whereby the spear could be dismounted in spite of the presence of the blocking arrangement.

The simultaneously acting friction forces will, however, as mentioned before, be able to prevent this from happening when the spring ring only is exposed to a resting load from the axial forces F. If the side faces 20, 21 of the spring ring, however, simultaneously are acted on in the attack points at the edges 17, 19 (FIG. 3*b*) by a force standing perpendicular to the resultant R, the attack point in question edges 17 or 19 will be liable to move in the same direction as pointed out by the vector put together of said force and the resultant R.

Figure 6:
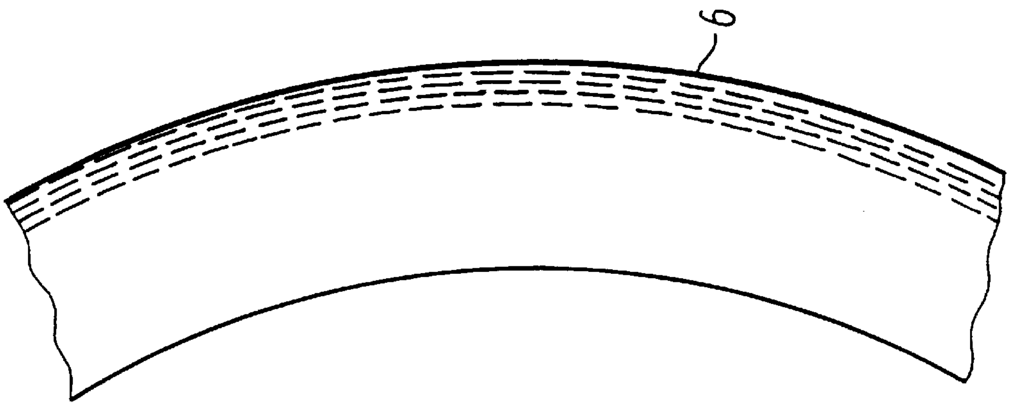
FIG. 6 shows in a larger scale a section of the spring ring shown in FIG. 5.

Such a second force, standing perpendicular to the resultant R, will precisely occur when the spear is rotated in relation to the corresponding neck ring. Thereby, the spring ring is brought to rotate in relation to, at least, one of the attack points 17, 19, which now, due to the above-mentioned conditions, will describe a spiral-like curve in relation to the surface of contact in question, as implied in FIG. 6. This spiral-like curve is, as regards the attack point 17, running from the location along the side face 20, as shown in FIG. 3*b,* to its end at the outer periphery of the spring ring. In this way, the spring ring finally is worked or screwed totally free from the projection 11, as shown in FIG. 3*c*. Hereafter, the spear can now without any problem be unscrewed without any of the risks as mentioned earlier.

As a spear thus being able to be dismounted, even if it should be secured against this by a blocking arrangement, is a result of the fact that, as it appears, the axial forces acting as reaction forces, when dismounting is attempted, have a positive resultant R, as shown in FIG. 7*a,* when a conventional blocking arrangement is used.

A conventional blocking arrangement will therefore provide a satisfactory security against axial displacement between the two parts only when being acted on by a resting load. This arrangement, for the above-mentioned reasons, is liable to fail when the two parts are moving simultaneously in another way in relation to each other, e.g., are carrying out a turning movement in relation to each other. The conventional blocking arrangements are, therefore, in reality of no use in securing, for example, a spear from being dismounted by an unauthorized person, if optimal security is demanded.

Figure 4C:
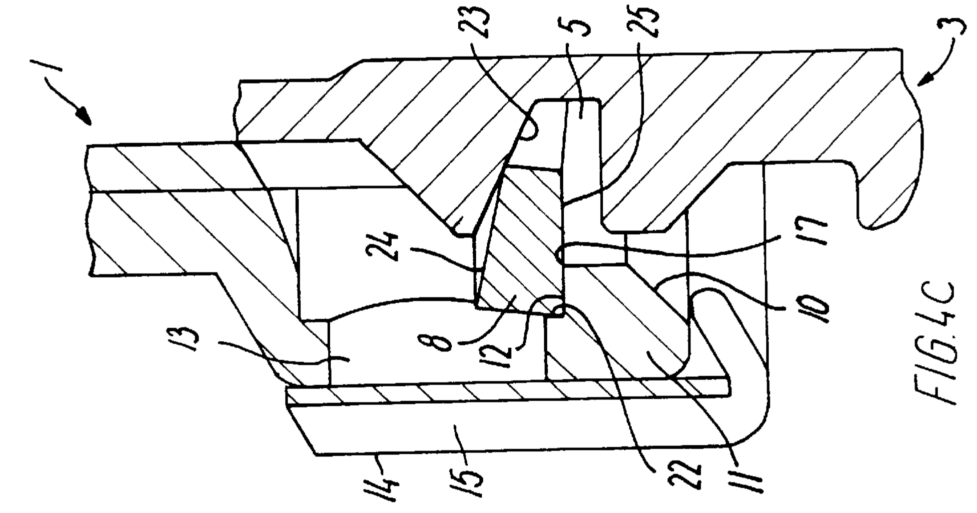
FIGS. 4*a, b* and *c* is the blocking arrangement shown in FIG. 2 seen in three successive steps during dismounting of the spear.
Figure 4B:
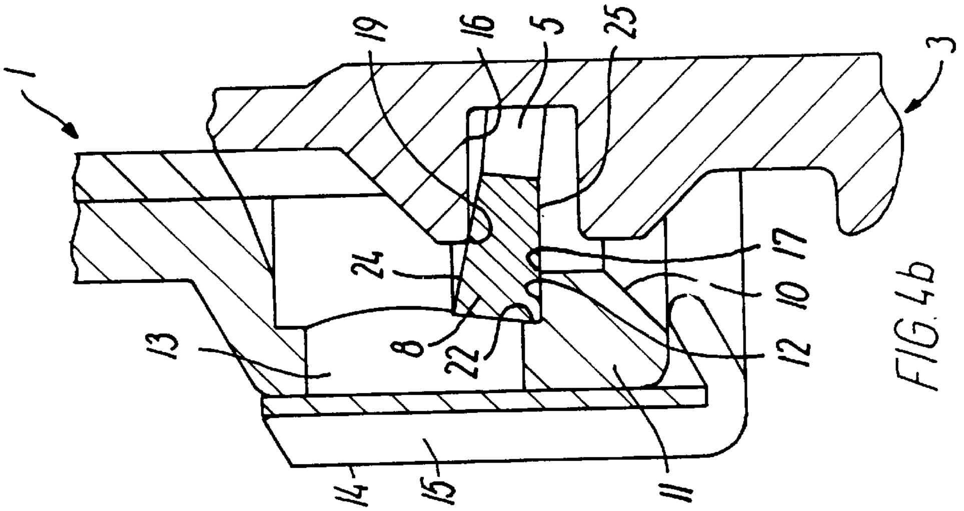
Figure 4A:
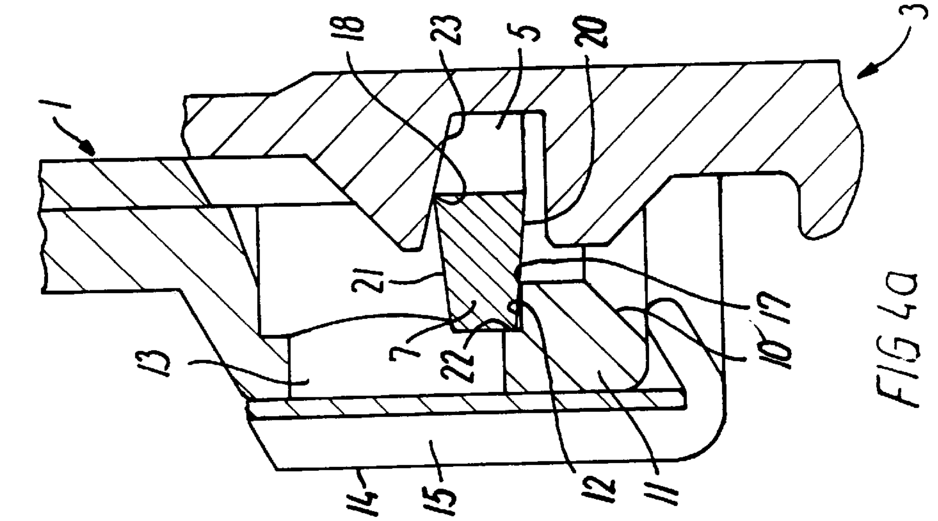

This disadvantage of the conventional blocking systems is remedied by means of the three embodiments shown as example in FIGS. 4*a,* 4*b* and 4*c* regarding a blocking arrangement according to the invention. The matching vector diagrams are seen from FIGS. 7*b,* 7*c* and 7*d*. Similar parts have in either case been given the same reference number as in FIGS. 3*b* and 7*a*.

FIGS. 4*a* and 7*b* are almost identical to FIGS. 3*b* and 7*a* with the significant difference that the upper side face 23 of the groove 5 now forms an angle β, which is negative. As β at the same time is larger than α, the resultant R will be negative, as shown in FIG. 7*b*. In this case, the resultant R is, therefore, pointing in the opposite direction of the deformation direction, and this causes the resultant R now instead, in opposition to the conventional blocking arrangements trying to squeeze the spring ring together, to try to expand the latter radially outwardly for abutting the inwardly turning cylinder face 22 of the spear when this is turned in relation to the neck ring. The blocking arrangement according to the invention therefore provides complete security against an unauthorized person dismounting the spear.

FIG. 4*b* shows another embodiment according to the invention. In this case, the groove 5 corresponds with the groove shown in FIG. 3*b*. While the conventional spring ring 7 shown in FIG. 3*b* has its greatest wall thickness at the inner diameter, the spring ring according to the invention shown in FIG. 4*b* is, however, thickest at the outer diameter. Thereby, the side faces 24, 25 of the spring ring 8 will obtain the inclinations shown in FIG. 7*c,* where the side face 25 inclines with a slightly positive angle of inclination α and the side face 24 with a larger negative angle of inclination β. In this way, a larger negative resultant is obtained than in the case shown in FIG. 4*a* and 7*b* and with that a proportionate larger security against unauthorized dismounting of the spear.

An additional security is obtained by the blocking arrangement shown in FIGS. 4*c* and 7*d*, combining the advantages of the blocking arrangements shown in FIGS. 4*a* and 4*b*. The upper side 23 of groove 5 has, as shown in FIG. 7*d*, the same negative angle of inclination as the corresponding side 23 in FIG. 4*a*, and the spring ring 8 has a cross-section of precisely the same shape as in FIG. 4*b*. As can be seen from FIG. 7*d*, an even larger resultant is obtained and thereby provides security against unauthorized dismounting of the spear as was the case before.

The embodiments shown for blocking arrangement according to the invention are only to be understood as examples, and the effects mentioned according to the invention can obviously be combined in many ways in order to obtain exactly the rate of security which is demanded for a given construction.

This construction might be a spear or any other construction, where two parts are to be mutually secured against axial displacement while they at the same time will be exposed to movement in relation to each other in directions other than the axial.

These movements can, as described above, be a mutual turning between two parts, but also be two parts being rocked to and fro in relation to each other.

The blocking arrangement, according to the invention, is also described above, and in the drawing as shown as a blocking arrangement, which operates in the one axial direction. The blocking arrangement can, of course, be double-acting whereby each part has two opposite turning blocking faces.

The deformation direction can moreover be opposite to the one shown in FIG. 3*a,* the inside part having an outwardly turning, cylindrical stop face for limiting the spring ring's radial deformation inwardly, while the outside part is constructed in such a way that the spring ring is allowed to have a free radial expansion outwardly in this.

What is claimed is:

1. A blocking arrangement to prevent opposite acting axial forces from axially separating a first part from a second part including a substantially cylindrical first part with a central axis and a mainly radially outward running first blocking face and a concentrically placed second part with an opposite mainly radially inward running second blocking face, which has a larger inside diameter than the outside diameter of the first blocking face, the arrangement comprising a resiliently deformable split spring ring between the two blocking faces which in a non-deformed position reaches across both blocking faces to prevent axial separation of the first and second parts and is deformable sufficiently, only in one radial direction as restricted by engagement with one of the parts, to bring the spring ring out of reach of at least one of the blocking faces and wherein the spring ring has a first side face facing the first blocking face and a second side face facing the second blocking face so that axial forces are transmitted from the first part to the spring ring and from the spring ring to the second part by means of edgewise contact between a first edge on one of, and a first engagement portion on the other of, the first blocking face and the first side face and between a second edge on one of, and a second engagement portion on the other of, the second blocking face and the second side face, each engagement portion of which in relation to a plane standing perpendicular to the central axis, seen in axial section, forms an attack angle, characterized in, that the total of the two attack angles, when the parts are subjected to the opposite acting axial forces, the angles diverge in a manner producing resultant force in the deformation direction sufficiently small that the spring ring is not deformed out of contact with the blocking faces under the opposite acting axial forces, when said first and second parts at the same time are exposed to any relative movement in relation to each other.

2. A blocking arrangement according to claim 1 wherein the total of the two attack angles is not greater than zero.

3. A blocking arrangement according to claim 1 wherein the spring ring has a greater axial thickness at the outside diameter than at the inside diameter.

4. A blocking arrangement according to claim 1, wherein the cross section of the spring ring is in the shape of a trapezoid with inwardly converging sides in said one radial direction.

5. A blocking arrangement according to claim 1 wherein at least one of the parts has a groove which includes one of the blocking faces and the spring ring is placed in the groove and said one radial direction of the spring ring points towards the groove, one side of which also forms one of the blocking faces wherein the blocking face in relation to a plane perpendicular to the central axis, seen in axial section, forms an angle which converges into the deformation direction.

* * * * *